INFORMATION HANDLING APPARATUS

Filed May 4, 1964 9 Sheets-Sheet 1

INVENTORS
WALTER R. LETHIN
LOUIS G. OLIARI
BY Robert J. Zunn
ATTORNEY

| CONTROL MEMORY REGISTERS | | |
|---|---|---|
| 1. | A-ADDRESS REGISTER | 32 |
| 2. | B-ADDRESS REGISTER | |
| 3. | SEQUENCE ADDRESS REGISTER | |
| 4. | CO-SEQUENCE ADDRESS REGISTER | |
| 5. | READ-WRITE CHANNEL 1-PRESENT LOCATION REGISTER | |
| 6. | READ-WRITE CHANNEL 1-STARTING LOCATION REGISTER | |
| 7. | READ-WRITE CHANNEL 2-PRESENT LOCATION REGISTER | |
| 8. | READ-WRITE CHANNEL 2-STARTING LOCATION REGISTER | |
| 9. | READ-WRITE CHANNEL 3-PRESENT LOCATION REGISTER | |
| 10. | READ-WRITE CHANNEL 3-STARTING LOCATION REGISTER | |
| 11. | WORKING LOCATION USED BY C.P. | |

Fig. 1A

INVENTOR.
WALTER R. LETHIN
LOUIS G. OLIARI
BY Robert J. Zinn
ATTORNEY

INVENTORS
WALTER R. LETHIN
LOUIS G. OLIARI
BY Robert J. Zunn
ATTORNEY

INVENTORS
WALTER R. LETHIN
LOUIS G. OLIARI
BY Robert J. Zinn
ATTORNEY

INVENTORS
WALTER R. LETHIN
LOUIS G. OLIARI
BY Robert J. Zinn
ATTORNEY

Fig. 5a Timing Chart for the Extraction Phase of a PDT Instruction
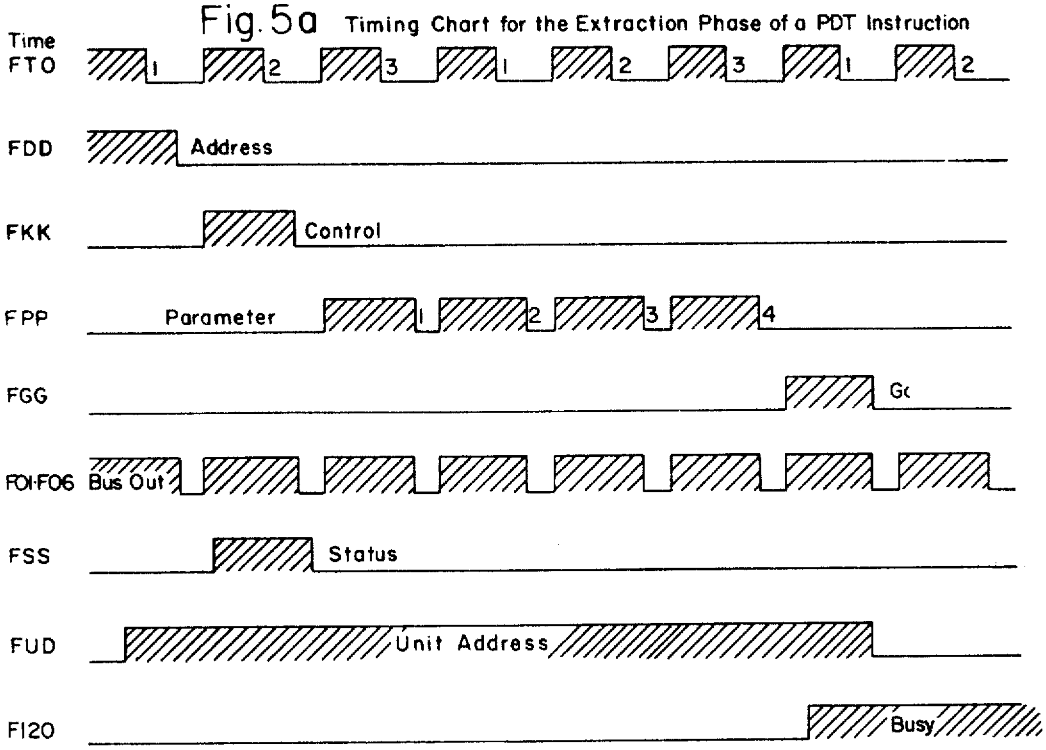
Fig. 5b Timing Chart for the Execution of a PDT Instruction
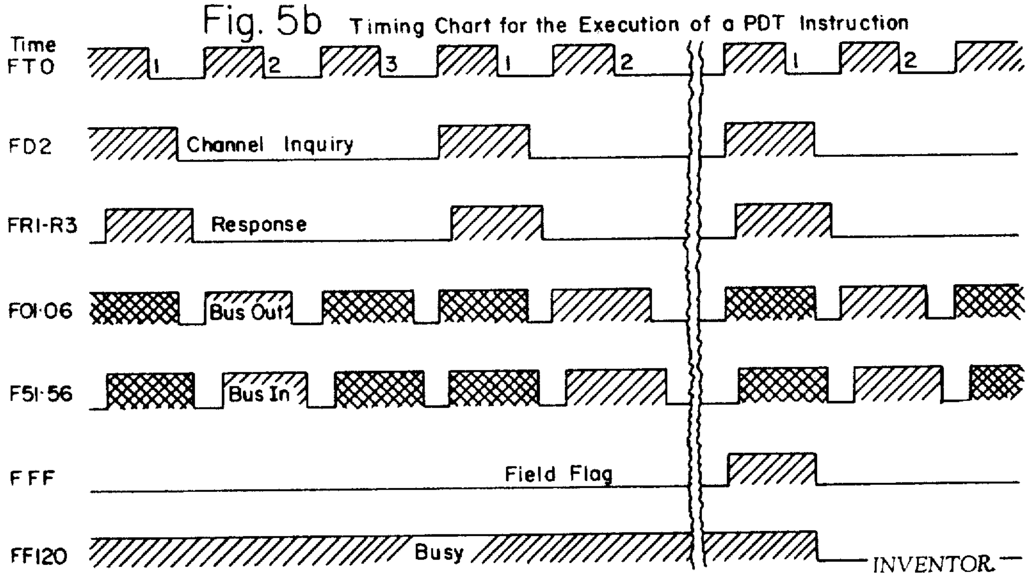
INVENTOR
WALTER R. LETHIN
LOUIS G. OLIARI
BY Robert J. Zinn
ATTORNEY INVENTORS
WALTER R. LETHIN
LOUIS G. OLIARI
BY Robert J. Zunn
ATTORNEY

INVENTORS
WALTER R. LETHIN
LOUIS G. OLIARI

BY Robert J. Zinn
ATTORNEY

INVENTORS
WALTER R. LETHIN
LOUIS G. OLIARI
BY Robert J. Zinn
ATTORNEY

United States Patent Office 3,369,221
Patented Feb. 13, 1968

3,369,221

INFORMATION HANDLING APPARATUS

Walter R. Lethin, Canton, and Louis G. Oliari, Brockton, Mass., assignors to Honeywell Inc., a corporation of Delaware Filed May 4, 1964, Ser. No. 364,686
14 Claims. (Cl. 340—172.5)

A general object of the present invention is to provide a new and improved electronic data processing apparatus. More specifically, the present invention is concerned with a new and improved apparatus which may be an integral part of a data processing system wherein the apparatus is characterized by its ability to provide for the flexible handling of characters or words of information as they are transferred within the system whereby information to be transferred between a peripheral device and a main memory may be directly addressed to any storage location therein without the need of extensive buffering, or further necessitating that the information to be transferred be routed through a separate image area of memory.

Data processing systems are frequently organized with the heart of the system consisting of a central processor which comprises a control unit, an arithmetic unit, and a high-speed memory which is readily accessible to the control and arithmetic circuits associated with the central processor. Surrounding the central processor are input-output communications channels leading to peripheral devices. Such peripheral devices may take the form of card readers for supplying input data, bulk storage device such as magnetic tapes or drums for storing the large masses of data, and printers for providing a visual record of the result of data processing. A representative form of such a system is disclosed in the patent of Henry W. Schrimpf entitled "Information Handling Apparatus," Patent Number 3,029,414, issued March 10, 1962.

The aforementioned Schrimpf patent is directed to a data processing apparatus which permits the system to operate "on-line" with respect to a plurality of peripheral input-output devices simultaneously with the processing of programmed data. In order to implement the above-outlined mode of operation, there is provided within the system a traffic control or demand scanning circuit which senses in sequence a plurality of demand lines to detect the presence of a signal generated by a peripheral input or output device which is calling for a data manipulation. In a representative embodiment of the time sequencing circuit, means may be provided to scan a plurality of input lines at electronic speeds. The active demand inputs are sensed so that it is possible to execute an instruction relating to an associated peripheral device when operation is desired. Alternatively, if no such demand signal is sensed, the central processor will utilize the available time. The time sequencing circuit may be arranged to scan directly the demand lines associated with the specific peripheral device or, in a more efficient system, a limited number of successive processing periods may be made available to be assigned by the programmer to the various peripheral devices as required. A sequencing circuit operative in the latter mode may well be of the type illustrated in the copending application of Louis G. Oliari and Robert P. Fischer, bearing Serial Number 357,362, filed April 6, 1964.

In the implementation of the hereinbefore referred to Schrimpf patent, each of the peripheral devices connected to the time sequencing and scanning circuitry is provided with a buffer register. In addition, each of the peripheral devices must have associated therewith a particular address register to keep track of the location of the high-speed or main memory being addressed.

Thus in the processing of a "print" order, in a system constructed in accordance with the principles set out in the above-mentioned Schrimpf patent, the address of the first word or character to be read out of main memory is placed into the address register associated with the printer. As each word or character is read out of main memory, the associated address register is incremented by unity so that the address register will then indicate the location of the next character or word to be transferred. In this manner, a block of 120 characters of information to be printed is transferred out of an area of main memory to a buffer register associated with the printer.

The significance of the buffer may be seen when related to a printer which is of the drum type having a line of like characters distributed across the face of the drum. As the drum rotates, each row of characters is moved into printing position with respect to a set of cooperating print hammers, the 120 characters of information contained in the buffer register are thus reviewed in order to establish which, if any, of the print positions have the particular character presently under review stored therein. Accordingly, the number of reviews or reconsiderations of buffered information must be equal to the number of printable characters; that is, the number of different types of characters which constitute a complete block of print as found on the print drum.

It is therefore a primary object of this invention to provide a new and improved signal scanning and sequencing circuit which is capable of allocating a plurality of time-phased operating subintervals in sequence and for effecting the transfer of information to and from a peripheral device without the necessity of first buffering the information to be transferred.

Alternative arrangements of data processing equipment have been proposed in which the information to be transferred to a peripheral device need not be buffered; however, in such systems separate image areas are reserved which serve as intermediate transfer areas for information being transferred between the main memory and a peripheral device. Thus, to effect a data transfer to a peripheral device, the information in a main memory is first moved into the image area so that as periodic reference need be made to the stored information, the pre-established memory area may be completely reviewed. Since these image areas are of fixed length, they are not efficiently adaptable to the manipulation of variable-length records. Also, since additional processing time is needed to effect the intermediate transfer to and from the image area, there is an obvious limitation on the efficiency and operational speed of such a system.

It is therefore another object of this invention to provide an improved data processing system including means to directly address all locations of main memory and transfer information directly between said main memory and a plurality of peripheral devices without necessitating an intermediate transfer through a reserved portion of the main memory.

Still another object of this invention is to provide a new and improved apparatus for implementing the foregoing objects which apparatus comprises a minimum amount of hardware and which apparatus is adapted to operate with maximum efficiency of main memory storage space and operating time.

In accordance with the principles of a preferred embodiment of the present invention, a data processing system is provided wherein a limited number of transfer or read-write channels are provided for interconnecting a central processor with any of its associated peripheral devices. Each of the transfer channels comprises a set of time-sequenced control circuits which is adapted to be operatively associated with a peripheral device and a main memory unit for effecting a transfer of data or a control function over a common distribution circuit. More specifically, the time-sequenced control circuits comprise a pair of storage registers, one of which stores information identifying the area of main memory currently being addressed, while the other register stores the starting address location of main memory at which the particular data transfer is initiated. With respect to these registers, the former will hereinafter be referred to as the starting location register while the latter is designated the current or present location register.

A transfer of information between the main memory and a particular one of the associated peripheral devices is initiated by the programmer designating one of the transfer or read-write channels to be associated with a particular peripheral operation. This, plus additional information pertinent to the processing of a peripheral data transfer instruction, is extracted from a program instruction. The additional information may include the identity of the peripheral device involved in the data transfer as well as the identity of the information to be transferred. Accordingly, the digital representation identifying the location in main memory at which the transfer is to begin is entered into both the present and starting location registers.

The programmed peripheral device includes means for generating signals indicating a desire to effect the transfer of a unit of information, which may comprise a character or a word. In response to these demand signals, the information stored in the location of main memory, as identified by the digital representation in the present location counter, may be transferred to the programmed peripheral device; alternatively, information from the peripheral device may be transferred into the identified storage location of main memory. Somewhat simultaneous with this information transfer, the contents of the present location register may be modified, that is, either decremented or incremented, so as to register the succeeding location of memory to be referenced.

After all the storage locations comprising a particular area of memory have been referenced, a rescanning operation may be initiated, or a new area of memory may be referenced. To initiate a rescanning operation the digital representation of the starting location register is transferred into the present location register. Somewhat similarly, the referencing of a new area of memory is initiated by effecting the transfer of the digital representation of the present location register into the starting location register. In the description of a preferred embodiment of the present invention which follows, an area of memory may be considered as comprising a variable number of storage locations within the main memory, the limits thereof being defined by the digital representation stored in the starting location register in combination with particular punctuation associated with the characters or words of information being transferred.

In the implementation of the present invention, a memory cycle distributor is provided, the cycling time of which consists of a plurality of subintervals each of which is associated with a particular one of the transfer or read-write channels. The memory cycle distributor is associated with a peripheral interface which operatively connects a plurality of peripheral deivces with a main memory over a common distribution circuit on a time-sharing basis. Thus, in the processing of a data transfer instruction calling for a particular peripheral device, the program instruction may direct that the operation be effected via a particular read-write channel. Accordingly, utilizing a particular pair of control memory storage registers, words or characters of information will be transferred between the main memoy unit in the particular peripheral device over the common distribution circuit during successive memory cycle subintervals associated with the selected read-write channel.

Means are also provided to indicate the operative condition of each of the read-write channels. These indicating means may be set in response to a data transfer instruction to thereby reserve to the particular peripheral device called for by the program instruction, the memory cycle subinterval associated with the selected read-write channel. A read-write channel reserved to the processing of a particular program instruction will thus be unavailable for the purpose of interconnecting another peripheral device with the main memory during the operative duration of the execution phase of the present instruction. However, since only a small fraction of the time required to complete the execution of the instruction will be spent with the peripheral device in actual communication with the main memory, those memory cycle subintervals allocated to the processing of the particular instruction, but found to be not needed, will be available for the processing of central processor orders or for the extraction of other peripheral data transfer instructions which are to be executed via another read-write channel. It is thus apparent that the other peripheral devices may be programmed to operate on the other available read-write channels so as to enable the system to simultaneously process a plurality of peripheral instructions. Upon completion of a data transfer instruction the means indicating the operative status of the associated read-write channel will be automatically reset so that the particular read-write channel will be automatically available for the processing of another peripheral data transfer instruction.

By incorporating the foregoing features in combination with the principles of this invention, it is possible to construct a data processing apparatus capable of effecting the transfer of successive characters or words of information between an area of main memory and any one of a plurality of peripheral devices over a common distribution circuit on a time-sharing basis. Thus, the starting and present location counters associated with a particular one of the transfer or read-write channels cooperates to retain the starting and present location address of a sequence of characters or words to be transferred such that upon the generation of demands by a programmed peripheral device a character or word of information will be transferred between the location of main memoy specified by the present location counter and the programmed peripheral device. This transfer occurs during the time cycle associated with the particular transfer or read-write channel. Somewhat simultaneously with the transfer of the character or word of information, the present location counter will be modified so as to register the location within main memory of the next character or word of information to be transferred. Utilization of this technique makes it possible to effect a data transfer without necessitating an intermediate transfer to a separate image area of memory or a buffered input to the programmed peripheral device while still making the information being transferred readily accessible for subsequent scanning operations.

The foregoing objects and features of novelty which characterize the invention as well as other objects of the invention are pointed out with particularity in the claims annexed to and forming a part of the present specification. For a better understanding of the invention, its advantages and specific objects obtained with its use, reference should be had to the accompanying drawings and descriptive matter in which there is illustrated and described a preferred embodiment of the invention.

Of the drawings:

FIGURE 1A is a diagrammatic representation of the control memory of FIGURE 1;

FIGURES 5*a* and *b* are timing charts pertinent to the extraction and execution cycles of a peripheral data transfer instruction.

Figure 1:
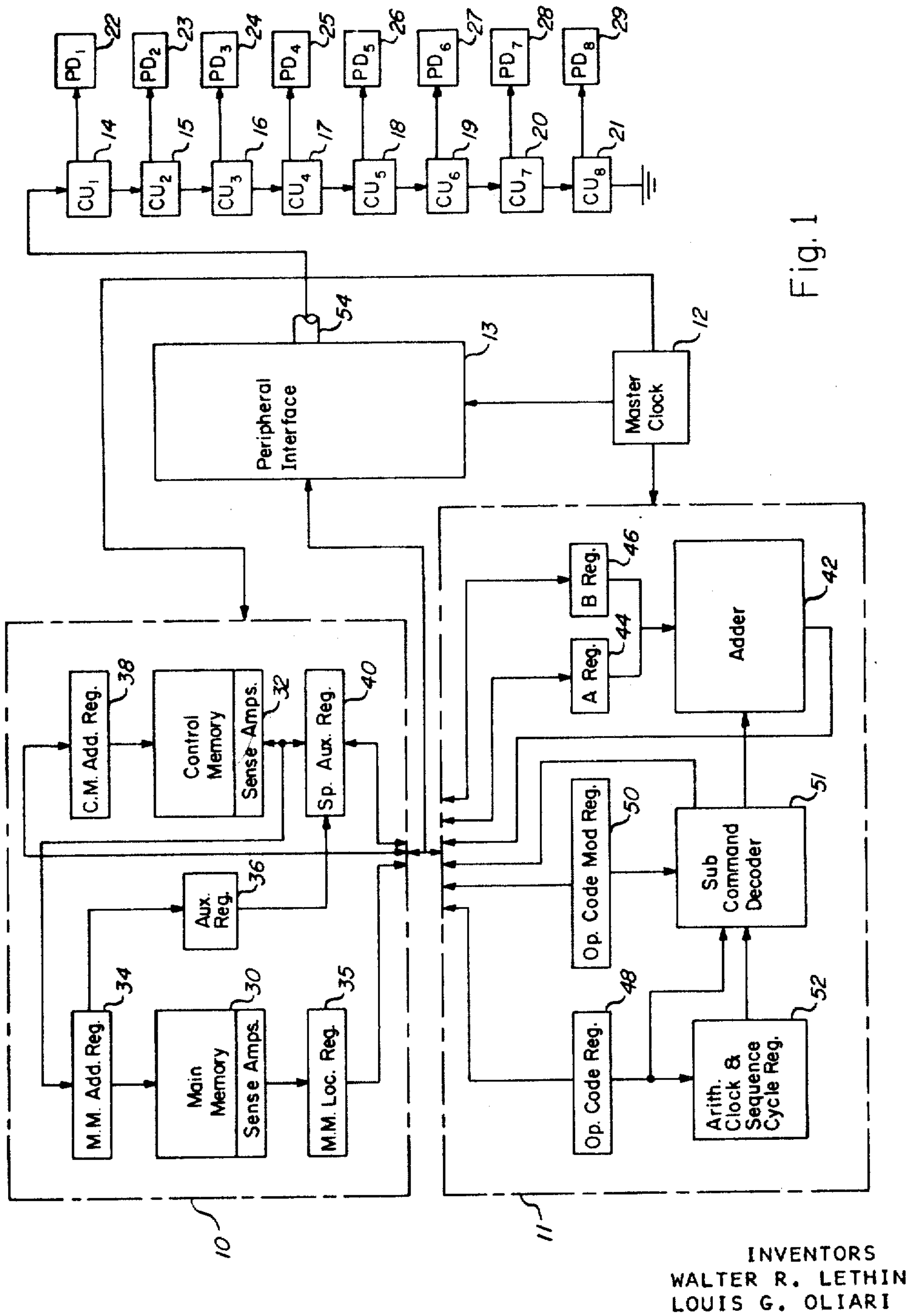
FIGURE 1 is a diagrammatic representation of a data processing apparatus incorporating the principles of the present invention.

Referring first to FIGURE 1, therein is shown an electronic data processing system constructed in accordance with the principles of this invention which comprises a central processor including a memory portion 10 and an arithmetic unit 11. A master clock 12 is employed to generate timing signals basic to the synchronization of all units within the system. It is to be understood that the processing of instructions within the central processor will proceed in accordance with the basic mode of operation common to this type of apparatus. In this respect, it is common to have associated with the central processor a plurality of peripheral devices which function to transfer data to and from the rest of the system. The peripheral devices may include magnetic storage units, card readers and card punches, random access units, intermediate drum memories, communication equipment and a variety of other special devices such as is disclosed in the copending application of Henry W. Schrimpf filed January 25, 1957, bearing Serial Number 636,256. In the illustrated embodiment, a peripheral interface 13 is provided to operatively connect both the memory portion 10 and the arithmetic unit 11 to a plurality of peripheral control units 14 through 21, which in turn control the activities of associated peripheral devices $PD_n$, indicated generally as members 22 through 29. These peripheral devices are capable of generating a variety of signals which, when transferred to the central processor, indicate the nature of the demands generated.

Considering in more detail the various components of a preferred embodiment of the present invention, FIGURE 1 further discloses a main memory 30 and its associated sense amplifiers. The memory portion may comprise a multi-plane coincident current core storage unit of the form described in the copending application of Henry W. Schrimpf, referred to above. Access to the main memory 30 from a control memory 32 and its associated sense amplifiers may be provided by a multi-stage main memory address register 34 which contains the address of the location within memory being referenced. Associated therewith is an auxiliary register 36 whose function it is to increment, decrement or transmit unchanged the contents of address register 34 into a designated area of control memory 32. Information enters and leaves the main memory locations addressed by register 34 via a main memory local register 35 which also generates checking information pertinent to the data being brought into memory and rechecks the data as it is withdrawn.

Included in the control memory 32 are a plurality of multi-position storage registers each of which stores information pertinent to the processing of various program instructions. In this respect, all the program instructions are processed through the control memory which aids in the selection, interpretation and execution of these in order. In performing these functions, the control memory 32 coordinates the various activities of receiving data, effecting an inter-memory transfer within the central processor, and transferring processed data to the various peripheral devices.

Reference is now made to FIGURE 1A which discloses in some detail the control memory 32 of FIGURE 1. In the preferred embodiment of this invention the control memory comprises a linear select core memory consisting of up to 16 individually addressable control registers. The number of registers actually available will vary with the system configuration. In this respect, although the control memory of FIGURE 1A has the ability to address 16 locations, only 11 are shown as being actually used. These 11 registers include A and B address registers, sequence and co-sequence registers, and present and starting location registers associated with each of the various read-write channels.

The plurality of locations within the control memory 32 are addressed through a control memory address register 38. Information is transferred into the control memory from either the auxiliary address register 36 or the arithmetic unit 11, by way of a special auxiliary register 40. In addition, the control memory is capable of transferring any of its words into the main memory address register 34 for control thereof.

The arithmetic unit 11 of FIGURE 1 is basically composed of an adder 42 capable of performing both binary and decimal arithmetic which may take the form for such registers as described in the text of R. K. Richards entitled "Arithmetic Operations in Digital Computers," D. van Nostrand Company, 1955. Two operand storage registers 44 and 46 are operatively connected to the input of adder 42 and provide means for storing the A and B operand data during the processing of program instructions. Two additional registers 48 and 50 are provided for storing the operation code and the operation code modifier. The operation code, which will hereinafter be referred to more simply as the OP code, defines the fundamental operation to be performed by the instruction. The OP code modifier, or variant character, is used to extend the definition supplied by the OP code.

The arithmetic unit 11 is further provided with a special clock and sequence cycle register 52 which is activated in accordance with the activation of the arithmetic unit itself. It is to be noted that, as regards the present invention, in the processing of a program instruction involving a peripheral device, the arithmetic unit is utilized to identify the nature of the instruction and define the parameters involved. The operation of the arithmetic unit 11 is in turn synchronized with the operation of the peripheral interface 13 and the associated peripheral equipment such that priority of processing is granted to the latter. In this respect, the apportioning of memory cycle time intervals between the arithmetic unit 11 of the central processor and the peripheral devices 22 through 29 is such that so long as peripheral demands are being generated for a particular read-write channel, the arithmetic unit is precluded from operating during that particular time cycle. Accordingly, the arithmetic clock and sequence cycle register 52 become operative only when a time interval allocated to a particular read-write channel is found not to be in demand by any of the peripheral devices.

The arithmetic clock and sequence cycle register 52, together with the OP code register 48 and the OP modifier register 50, are connected to a subcommand decoder unit 51. The subcommand decoder 51 is in turn operatively connected to adder 42 and is further connected to the peripheral interface 13 and the memory portion 10 to thereby define the sequence of activities during the extraction phase of an order.

The various operating registers associated with the memory portion 10 and the arithmetic unit 11 may take the form of a series of interconnected bistable devices having appropriate coupling circuits between the stages so that the registers may be operated in a serial fashion. A representative form of such a register will be found in the above-mentioned copending application of Henry W. Schrimpf. In the event optimum speed is a requirement, the registers may be operative in the parallel mode whereby the respective stages are simultaneously examined, in which event the registers may take the form for such registers as described in the text of R. K. Richards referred to above.

The ability of the present invention to process a stored program simultaneously with the operation of a plurality of peripheral devices is in large part due to the functioning of the peripheral interface 13. The peripheral interface 13 consists primarily of a memory cycle distributor having a sequencing cycle consisting of a predetermined number of subintervals.

Figure 2:
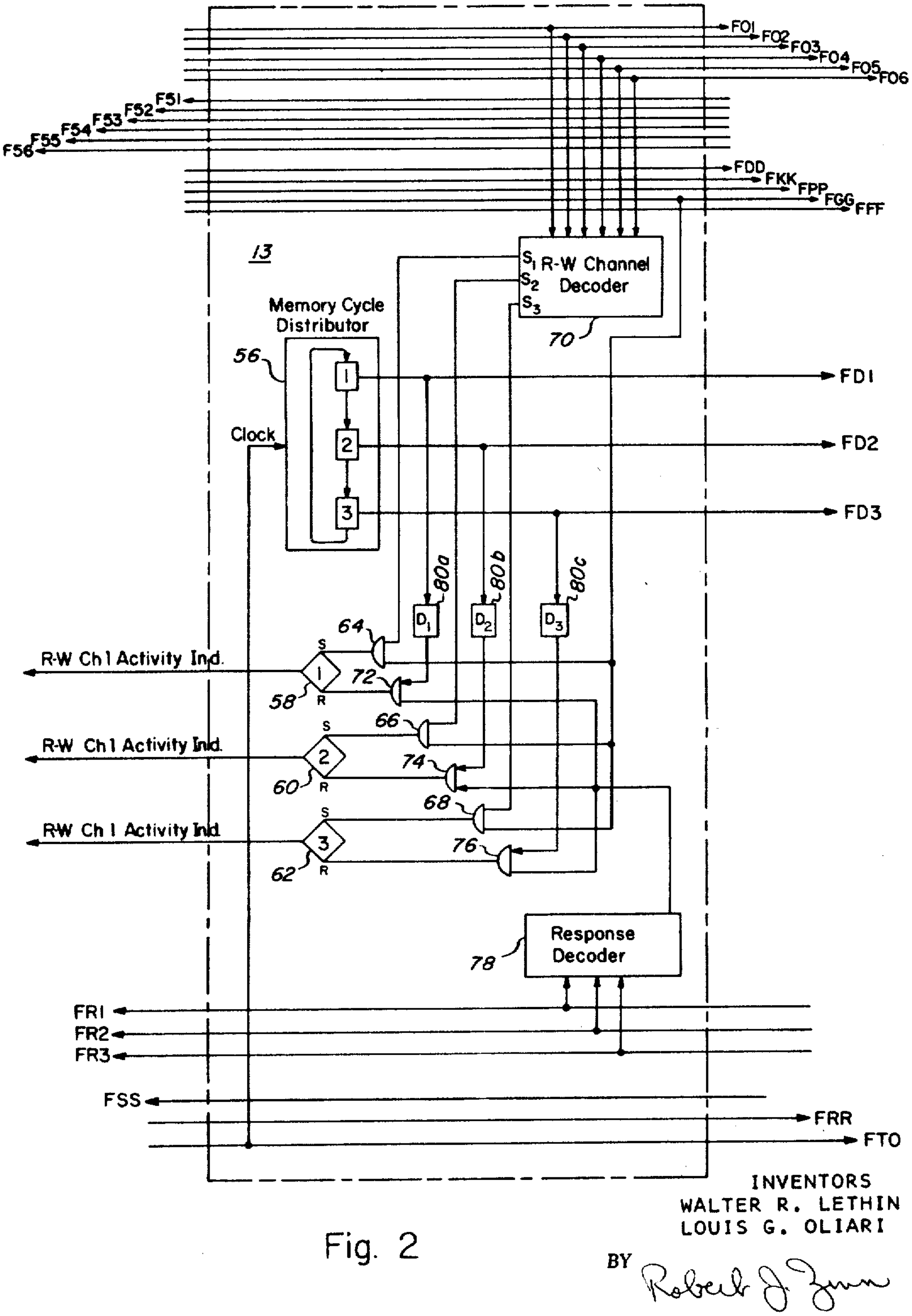
FIGURE 2 is a diagrammatic representation of the logic circuitry for implementing the activity of the memory cycle distributor of FIGURE 1.

The memory cycle distributor is thus essentially comprised of a cyclically operative sequencing circuit which successively allocates to each of a plurality of program-controlled read-write channels, a portion of an operative cycle. The memory cycle distributor may comprise a multi-stage ring counter which in turn may consist of a series of bistable devices connected such that at any one time, only one of the bistable devices is in a "set" condition. FIGURE 2 discloses a particular implementation of a preferred embodiment of a peripheral interface including a memory cycle distributor as constructed in accordance with the principles of the present invention. The memory cycle distributor of FIGURE 2 consists of a three-stage ring counter 56. Timing signals from the master clock 12 are used to synchronize the operation of the ring counter 56 so as to enable the "set" state to automatically progress from the first stage to succeeding stages in a time-ordered fashion so as to thereby establish three time-oriented signals FD1, FD2, FD3 on the output lines associated with the respective counter stages.

The peripheral interface 13 further includes activity indicators 58, 60 and 62 associated with each of the read-write channels to indicate whether or not a particular read-write channel is currently assigned. The operative function of the read-write channel activity indicators may be performed by a two-state device having "set" and "reset" inputs and appropriate means for indicating the operative condition of the device. A plurality of AND gates 64, 66 and 68 are operatively connected to the "set" inputs of the activity indicators 58, 60 and 62 respectively. AND gates 64, 66 and 68 are in part conditioned by signals from a read-write channel decoder 70 which takes the information off the data transfer lines FO1–FO6 to identify a particular one of the read-write channels as being assigned to a particular peripheral device. The conditioning of AND gates 64, 66 and 68 is completed by a control signal FGG indicating that read-write channel assignment information is presently being trasferred to a particular peripheral control unit. Similarly, AND gates 72, 74 and 76 are operatively connected, through delay means $80_a$, $_b$ and $_c$, to the reset input of activity indicators 58, 60 and 62 respectively. AND gates 72, 74 and 76 are in turn conditioned by an end-of-order signal generated within a response decoder 78.

As will hereinafter be developed, the end-of-order signal, as detected by response decoder 78, is generated within the peripheral control unit upon detection of a signal representation indicating that a particular data transfer instruction has been completed. It will also become apparent that the transfer of the response signals through the peripheral interface 13 will be initiated by one of the time-oriented signals FD1, FD2 or FD3 associated with the particular read-write channel being reset. Since this same signal is combined in an AND gate 72, 74 or 76 with the output of response decoder 78, delay means $80_a$, $_b$ and $_c$ are provided to ensure that the end-of-order response signal is in synchronization with the further conditioning signal generated an output lines FD1, FD2 or FD3.

As mentioned above, in regards to FIGURE 1, the peripheral interface 13 is serially connected to the plurality of peripheral control units 14–21 by means of a common distribution line 54. The common distribution line 54 further comprises a plurality of electrical leads including data output lines FO1–FO6 (FIGURE 2) which transfer information from the central processor, through the peripheral interface 13, to the peripheral devices 22–29 associated with the respective peripheral control units 14–21. Similarly, data input lines F51–F56 (FIGURE 2) are utilized to transfer information from the peripheral devices 22–29 through the respective peripheral control units 14–21 (FIGURE 1) and the peripheral interface 13, to the main memory 30. Channel inquiry lines FD1–FD3 transfer the read-write channel activation signals from the peripheral interface 13 to the peripheral control units 14–21 to thereby identify a memory cycle subinterval allocated to a preconditioned peripheral control unit 14–21.

A plurality of control lines FDD, FKK, FPP, FGG and FFF are selectively activated in conjunction with the data output lines FO1–FO–6 to identify the nature of data being transferred to the various peripheral control units during the processing of a peripheral data transfer instruction, i.e. response lines FR1–FR3 return selectively coded data through the peripheral interface 13 to indicate whether or not a particular peripheral device, which has been allocated the succeeding memory cycle subinterval, is desirous of communicating with main memory during that particular subinterval and, if so, the nature of the communication therewith. In addition, leads FTO, FSS, FRR are provided to transfer timing signals, initiate status checks and effect a clearing operation within the peripheral control units 14–21.

Figure 3:
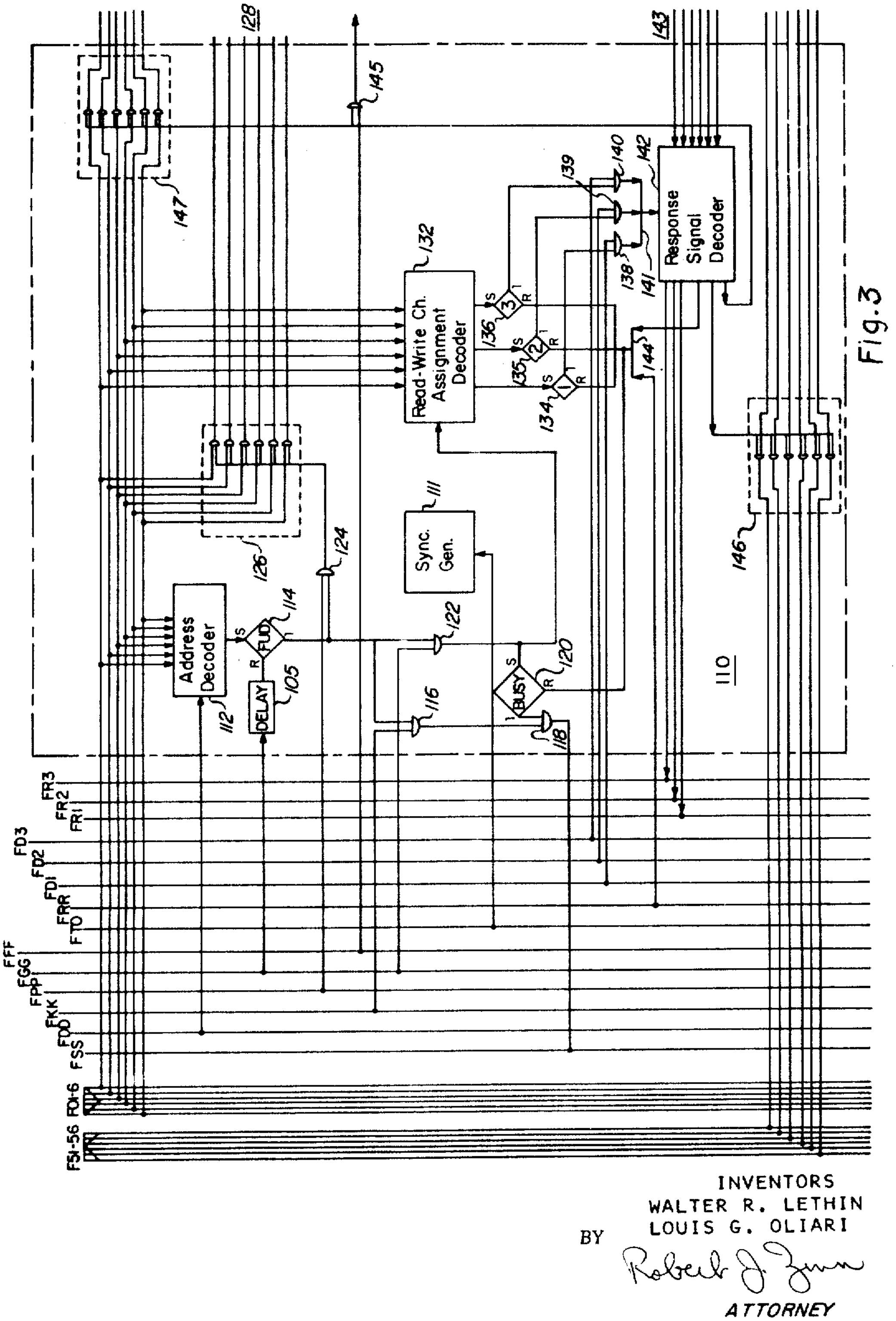
FIGURE 3 is a diagrammatic representation of the logic circuitry of a peripheral control unit constructed in accordance with the principles of the present invention.

Each of the control units 14–21 is equipped with appropriate circuitry to receive and interpret the above signals; however, before going into the details of a peripheral control unit as disclosed in FIGURE 3, a preliminary discussion of the above-outlined system will be initiated. In this respect, the preferred embodiment of the present invention involves a character machine in which a single multi-bit character is transferred between main memory 30 and a particular one of the peripheral devices $PD_n$ during each of the memory cycle subintervals. The processing of an instruction involving the transfer of data between the main memory 30 and the peripheral devices 22–29 occurs in two operative steps; namely, the characters of the instruction are first extracted from main memory, whereafter the information transfer is executed. As mentioned above, priority of processing is granted to the peripheral devices so that if a peripheral device wishes to communicate with main memory 30 during one of the memory cycle subintervals, a demand is generated within the associated peripheral control unit and returned to the central processor through the peripheral interface 13 on lines FR1–FR3. This demand is generated during the operative cycle immediately preceding the memory cycle subinterval associated with the read-write channel on which the transfer is to be effected. If a memory cycle subinterval associated with a particular read-write channel is not in demand, the time may be used to extract a single character of a program instruction from main memory 30.

As mentioned above, the peripheral data transfer PDT instruction is utilized to effect the transfer of information between the main memory and a peripheral device. The format of a typical PDT instruction may be as follows:

$$F/A/V/C_1 \ldots C_n$$

where

*F*=the OP code which defines the fundamental operation to be performed,

*A*=the address field which indicates the starting location of the operand field in the main memory and may be comprised of a plurality of characters,

*V*=the variant character which modifies the OP code to thereby extend the definition implied thereby, $C_1 \ldots C_n$=control characters which define parameters pertinent to a particular transfer operation.

In any programmed operation, the first step is to remove from memory the next instruction to be processed. Thus, as an instruction is processed, the characters of the instruction are transferred one by one out of successive main memory locations into the various operational registers of the central processor and control memory. In this respect, the extraction of an instruction is initiated with the instruction data contents of a location in main memory being specified by the sequence register of the control memory 32, after which the data is placed in the OP code register 48 and the sequence register is incremented.

In accordance with the nature of the operation of the subject system, the OP code or F character, which designates the type of operation to be performed, is actually brought out of main memory and deposited in the sequence register of control memory 32 during the termination of the extraction phase of the preceding instruction. More specifically, during the extraction phase of the processing of an instruction, each character is brought out of the main memory 30, in sequence, until a character with an accompanying punctuation bit is detected. Detection of the punctuation bit identifies the last character read out as the OP code of the next succeeding instruction, thereby signalling the termination of the extraction portion of the program instruction presently being processed.

After the processing of the "F" or OP code character, the sequence counter within control memory 32 contains the address of the next character to be extracted. This character is temporarily deposited in the register 44 whereafter it is retransferred to the A address register of control memory 32. The sequence register of control memory 32 is then incremented and the succeeding characters of the A address field are brought out and deposited in the A address register as outlined above. As mentioned above, the A operand specifies the location in main memory at which the data transfer is to begin. The next character to be extracted is the V character which designates the read-write channel to be used and the characteristics thereof. As the V character is extracted and the identity of the read-write channel specified thereby is established, the information from the A address field is transferred to the associated read-write channel's "starting location" and "present location" registers of control memory 32. Information stored in the starting location counter will remain stored therein, serving as a point of reference throughout the processing of a particular row of information of the peripheral data transfer order. In contrast, the information stored in the present location register of control memory 32 will be incremented, decremented, or will remain the same in accordance with the sequencing of the main memory address register 34, as outlined above.

$C_1$ of the control chaarcters is the next character of the instruction to be extracted, and designates the peripheral control unit being addressed. In subsequently available memory cycle subintervals, the characters $C_2 \ldots C_n$ are successively read out of main memory 30 and sent to the peripheral control unit via output lines FO1–FO6. These characters specify to the peripheral control unit the control information required during the data transfer, such as the format to be followed in a printout operation. As mentioned above, the processing of control characters is terminated upon the detection of a particular punctuation mark in combination with the first character of the next program instruction to be subsequently extracted from main memory.

Each of the peripheral control units 14–21 includes means which become operative upon receipt of an activation signal from the central processor, indicating a desire to communicate between main memory 30 and one of the associated peripheral devices 22–29.

Figure 4:
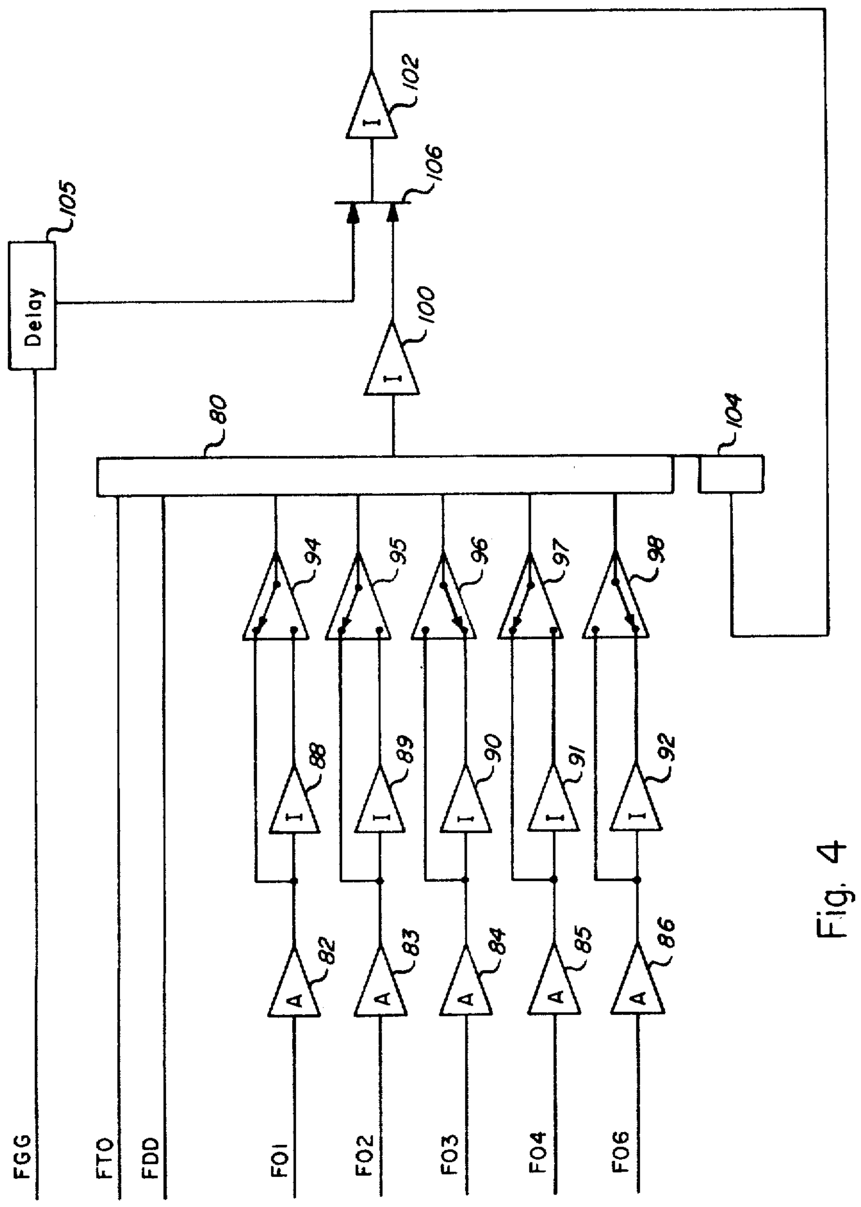
FIGURE 4 is a diagrammatic representation of the logic circuitry for implementing the addressing of the peripheral control unit of FIGURE 3.
Figure 6:
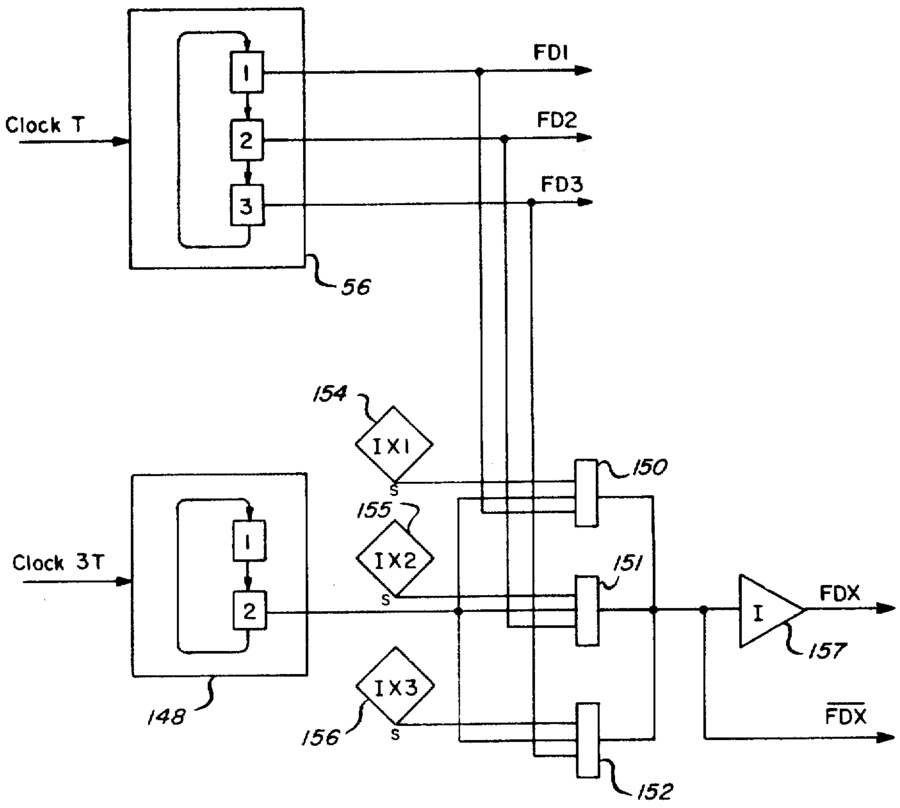
Figure 7:
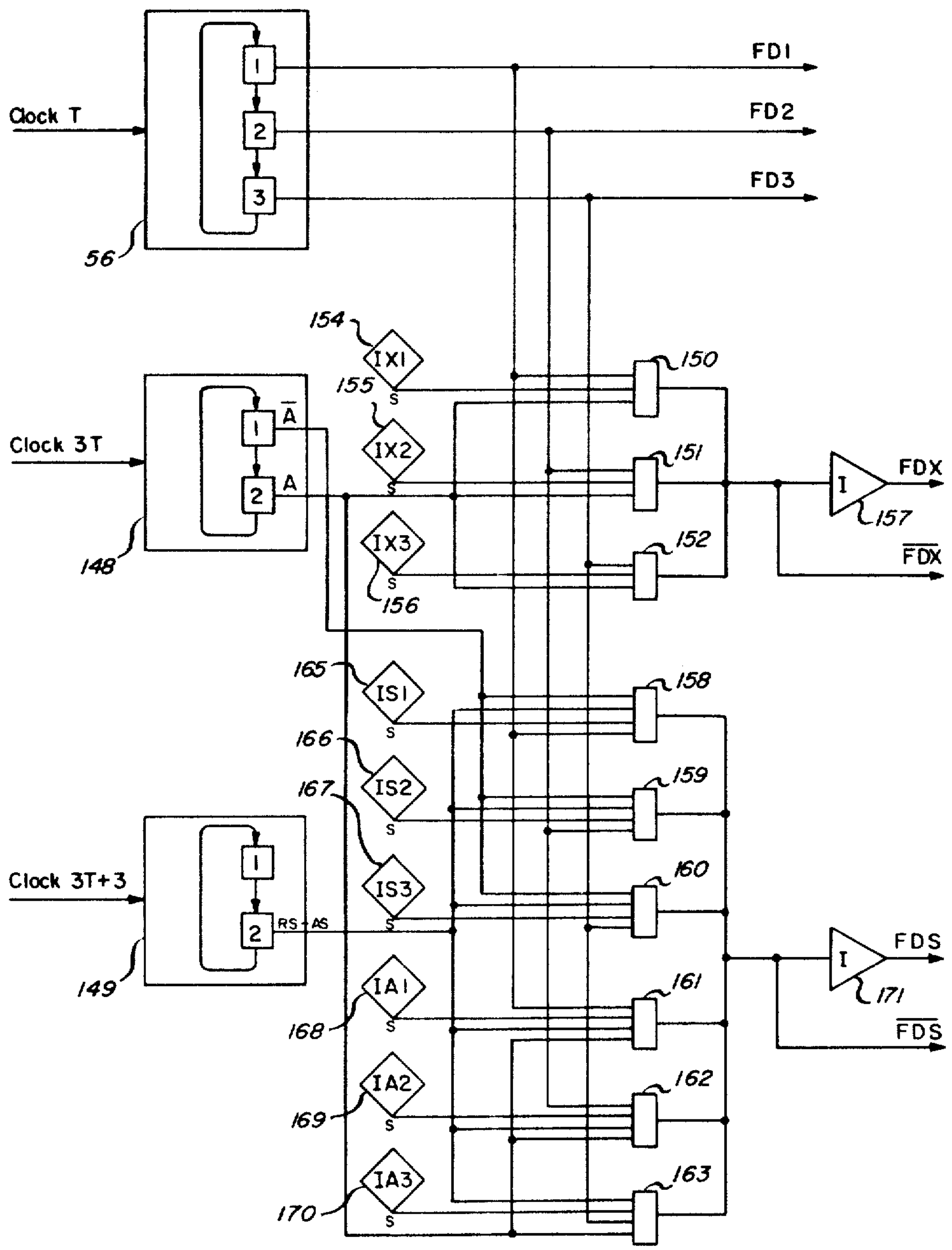
Figure 8:
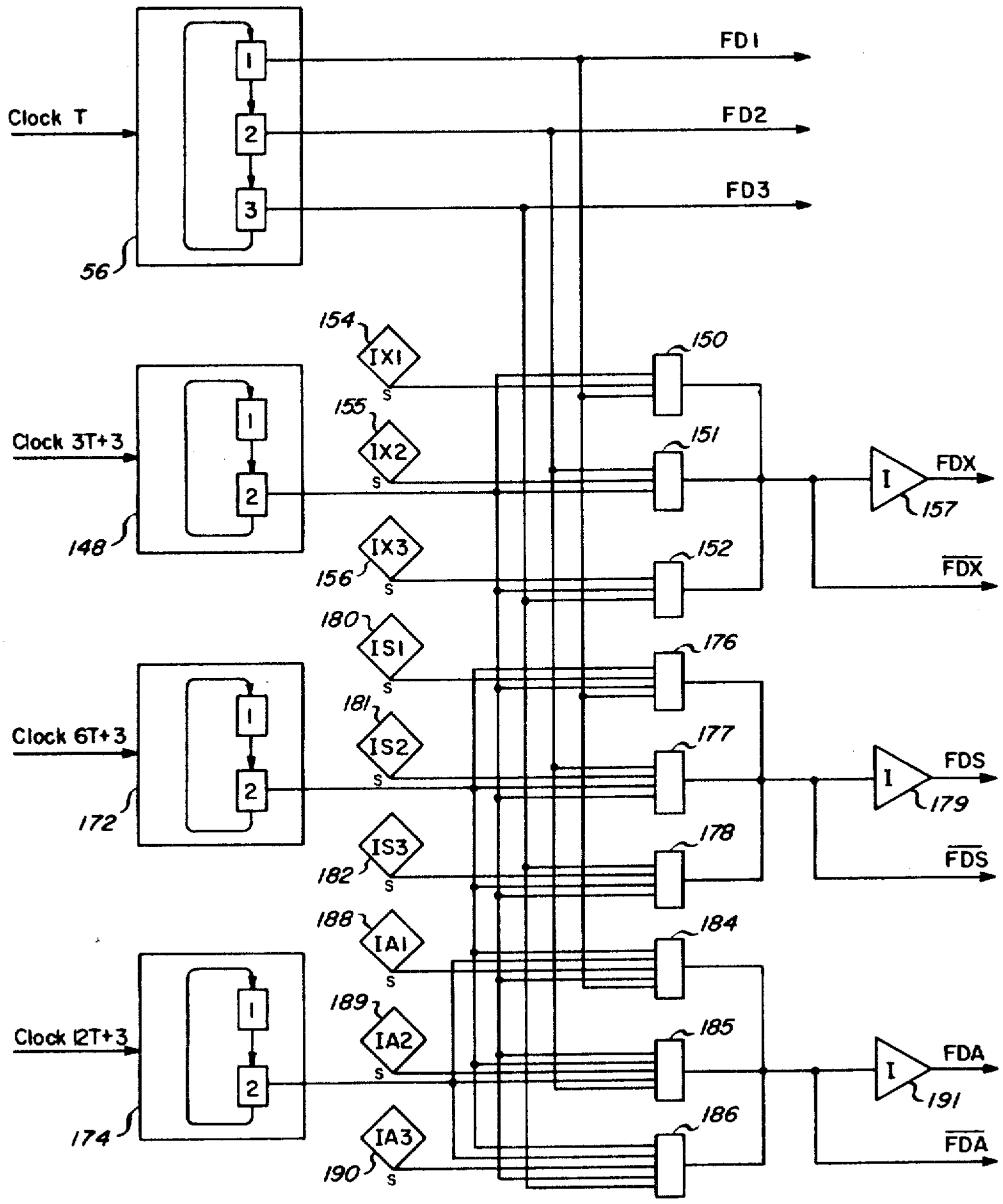

Reference is now made to FIGURES 3 and 4 which disclose a data representation of a preferred embodiment of a particular one of the peripheral control units 14–21 and the specific logic for effecting the selection of a particular one of the control units 14–21 by designating the control unit address thereof. Referring first to FIGURE 4, there is shown an AND gate 80 conditioned by a plurality of input signals including a timing signal FTO generated in the master clock unit 12 of FIGURE 1. Signal FDD, transferred from the central processor through peripheral interface 13, identifies the information presently being transferred from main memory 30 on the output data lines FO1–FO6 as being address-oriented and therefore pertinent to the conditioning of AND gate 80.

After being amplified in members 82–86, input signals FO1–FO6, which in themselves define a binary coded address, are alternatively shunted around, or channeled through, inverters 88–92 by selectively switching, or otherwise connecting, the circuit of one or the other of the connecting leads within select means 94–98. The selective switching is effected in accordance with the address associated with each of the particular peripheral control units. Thus, the switches are prepositioned to ensure that the proper conditioning signal will be delivered on all of the inputs to AND gate 80. In this manner, each of the peripheral control units 14–21 is made responsive to a particular coding address.

Upon conditioning of AND gate 80, inverter 100 is activated and the output signal therefrom in turn activates a second inverter 102. In addition to AND gate 80, AND gate 104 is also operatively connected to the input of inverter 100 and is conditioned by a feedback signal from inverter 102. The purpose of inverter 102 and the AND gate 104 is to sustain the operative duration of inverter 100 until a signal is detected indicating that the extraction portion of the particular data transfer instruction involving the associated peripheral unit has been completed. Accordingly, the control signal FGG, after being temporarily delayed in member 105, is transferred to gating means 106. The presence of the delayed FGG signal in combination with an output from inverter 100, terminates conduction within inverter 102, thereby effecting the removal of the conditioning signal from the input to gate 104 which further terminates conduction within inverter 100.

Reference should now be made to FIGURE 3 which discloses, in outline form, a peripheral control unit 110 with the leads constituting the common distribution circuit 54 of FIGURE 1 disclosed therein as leading into the topmost control unit 14 from the peripheral interface 13 and thereafter threading through the other peripheral control units 15–21. Shown here is a timing device 111 which is synchronized by a signal on control line FTO. It is to be understood that timing signals are generated herein and distributed to the various members of the control unit 110; however, in an effort to reduce unnecessary circuitry, these connections have not been shown as actual leads in the diagram of FIGURE 3.

The address decoder 112, in combination with flip-flop 114, constitute the subject matter of FIGURE 4 discussed above. Once set, flip-flop 114 remains set during the duration of the extraction cycle of the processing of a peripheral data transfer instruction. Thus, although the information being transferred from the central processor through the peripheral interface is distributed through each of the peripheral control units 14–21 of FIGURE 1, only the particular peripheral control units having had its address flip-flop 114 set by the preceding address character will attempt an interpretation of the information.

The output of flip-flop 114 is connected as a conditioning lead to AND gate 116, the latter being further conditioned by a signal from control lead FKK. The output of AND gate 116 is in turn connected to AND gate 118 which is further conditioned by an output from flip-flop 120. The output of still another AND gate 122 is used to switch flip-flop 120 to its "set" condition, AND gate 122 in itself being conditioned by an output signal from flip-flop 114 and a signal on control line FGG.

The output of flip-flop 114 is also connected as a conditioning signal to AND gate 124 which is also conditioned by a signal from control line FPP. The output of AND gate 124 is further used to condition gating means 126 to thereby enable certain parameters pertinent to the data transfer instruction being processed to be transferred a character at a time, via lines 128 to an associated peripheral device, not shown. The transfer of parameters continues so long as the control signal FPP is present in combination with an output indicating flip-flop 114 is in its set state, to thereby condition AND gate 124.

FIGURE 3 further discloses the output of AND gate 122 as being connected to the input of a read-write channel assignment decoder 132 which takes information off the data transfer lines FO1–FO6 to identify to the peripheral control unit the read-write channel to be associated with the processing of a particular data transfer instruction. The read-write channel assignment signal from decoder 132 is effective in setting one of three flip-flops 134, 135 and 136 so that subsequent channel inquiry signals, as generated on lines FD1–FD3, will be gated through AND gates 138, 139 and 140 respectively and thereafter buffered in an OR gate 141 whereafter the output signal thereof is in turn utilized to initiate the transfer of response signals from the response signal storage and decoder member 142. As mentioned above, the response signals are generated in the associated peripheral device and enter the decoder 142 via lines 143. In response to a gating signal from OR gate 141, the response signals are transferred from decoder 142, through the peripheral interface 13, to the central processor on lines FR1–FR3, to indicate whether the next succeeding memory cycle subinterval as allocated to this particular peripheral device is to be utilized or not, and if so, what the nature of the transfer is to be.

An end-of-order response signal, as detected in the response storage and signal decoder member 142 in addition to resetting the associated read-write channel activity indicator within the peripheral interface 13, as described above in connection with FIGURE 2, will also initiate an output which is buffered through OR gate 144 to thereby effect the resetting of flip-flops 134, 135 and 136 associated with the read-write channel assignment decoder. In addition, the end-of-order response signal will also reset flip-flop 120 to show that the associated peripheral control unit is no longer busy. Gating means 146 and 147 are shown as connecting the data input and output lines to the peripheral device or devices associated with the peripheral control unit. These gating means are conditioned by the various response signals, as decoded within member 142, to ensure that information will be transferred between the peripheral device and the main memory only during the assigned memory cycle subinterval. In this respect, since the read-write channel inquiry signal entering decoder 142 does so during the subinterval immediately preceding the memory cycle subinterval allocated to the read-write channel associated with the program instruction presently being processed, a sufficient delay must be established within decoder 142 to ensure that the output signal to gating means 147 will be in proper synchronization with the information appearing on lines FO1–FO6.

Since the various peripheral devices are all connected in common through the associated peripheral control units and the peripheral interface 13, there may be information on the data output lines FO1–FO6 at all times; however, none of the information on lines FO1–FO6 will be meaningful to the various control units except in the presence of a control signal directed to a particular one of the control units. It should be apparent from the above that these control signals will include FKK, FPP and FGG, in combination with the address signal FDD or its derivative FUD, as stored in flip-flop 114. The above signals are active during the extraction phase of a peripheral data transfer instruction and are supplemented by the signals FFF and FD1–FD3 which effect control of the peripheral control unit during the execution phase of a data transfer instruction.

As mentioned above, the resetting of address flip-flop 114 is effected by a delayed signal from control lead FGG, the signal being delayed sufficiently in delay member 105 to ensure that the other actions initiated by the FGG signal and dependent upon the flip-flop 114 being in its set condition will be completed before the address flip-flop 114 is switched to its reset condition. It has also been indicated above, that a clearing operation of the peripheral control units may be initiated by the console operator by directing a signal on control line FRR of FIGURE 3. As shown here the signal FRR is buffered through OR gate 144 to reset flip-flops 120, 134, 135 and 136.

The operation of the peripheral interface of FIGURE 2 and the peripheral control unit of FIGURE 3 will be best understood in terms of an illustrative example of a peripheral data transfer instruction effected in accordance with the operative routine depicted by the extraction and execution timing charts of FIGURES 5*a* and *b* respectively. For example, in a card read operation, as a memory cycle subinterval previously allocated to a particular read-write channel goes unused, the OP code of the peripheral data transfer instruction, as specified by the sequence register of the control memory 32, is transferred to the OP code register 48 of FIGURE 1, whereafter the sequence register is incremented. As a subsequent memory cycle subinterval is made available to the processing of the characters of the instruction in the arithmetic unit 11, the A address field information contained in the memory location specified by the sequence register, as incremented, is placed in the A address register of the control memory 32 to thereby identify the location in main memory at which the data transfer is to begin. Again, the sequence register of control memory 32 is incremented so that as the succeeding memory cycle subinterval is made available to the arithmetic unit, the V character is transferred from main memory to the OP code modifier register 50. The V character specifies the control memory address of the read-write register to be used in the execution of the data transfer instruction. As soon as the read-write channel specified by the V character is available, the information identifying the starting location of main memory, that is, the information contained in the A address register of control memory 32, is placed in both the current address register and the starting address register of control memory 32 associated with the read-write channel specified by the V character.

The extraction of the foregoing characters is actually preliminary to the designation of the particular peripheral control unit and its associated peripheral device which are to be utilized in the processing of the peripheral data transfer instruction. The $C_1$ character, which is extracted from main memory 30 during the next available memory cycle subinterval, specifies the peripheral control unit through which the transfer is to be effected. In this respect, the extraction of the $C_1$ character effects the generation of a signal on control line FDD which is fed to the address decoder 112 of each of the peripheral control units 14–21 so that, in combination with the information on data output lines FO1–FO6, the flip-flop 114 of the addressed peripheral control unit will be "set" in the manner outlined above for FIGURE 4. The switching of flip-flop 114 into its "set" condition initiates an output, of a voltage level here identified as a binary one, which conditions one side of AND gate 116. The other side of AND gate 116 is connected to control line FKK, which is now actuated to initiate a status check of the addressed peripheral control unit. Thus, the output of AND gate 116 will be gated through the associated AND gate 118 provided that flip-flop 120 is in its "set" state, indicative of a busy condition within the addressed peripheral control unit. If not busy, the output of flip-flop 120 will be "low" so that AND gate 118 will not be properly conditioned and the signal on line FSS, as sensed by the central processor, will indicate that the addressed peripheral control unit is not busy. If the addressed peripheral control unit is busy, the calling program is stalled pending the release of the particular peripheral control unit. As mentioned above, the resetting of flip-flop 120 to signal the release of a temporarily stalled program will be effected by the detection of an end-of-order signal in the response signal storage and decoder member 142 of FIGURE 3.

As soon as the control unit specified by character $C_1$ is available, the characters $C_2$–$C_n$ are successively read out as successive memory cycle subintervals are made available to the arithmetic unit. As mentioned above, characters $C_2$ through $C_n$ contain information pertinent to the processing of the particular data transfer instruction and may include information such as the address of a particular tape drive to be utilized in a tape read or write instruction, or the number of columns of data to be printed in a printing operation.

As mentioned above, the transfer of the parameters to the programmed peripheral device continues so long as the control signal FPP appears at the input to AND gate 124. The parameter transfer is terminated upon the detection of a particular punctuation bit accompanying a character of information being extracted from the main memory 30. As soon as the punctuation bit is detected, signalling the completion of the extraction phase, a signal is generated on control line FGG which is combined with input signals to the read-write channel assignment decoder 132 to thereby set flip-flops 134, 135 or 136, so as to identify to the addressed peripheral control unit the read-write channel to which it has been assigned for the execution of the data transfer instruction. In addition, the signal FGG is effective in setting flip-flop 120, thereby indicating that the peripheral control unit being addressed is now busy. The FGG signal is also delayed in member 144 to enable the foregoing operations to be completed before resetting address flip-flop 114.

Referring to the timing charts of FIGURE 5*a*, it is seen that the four extraction cycle signals FDD, FKK, FPP and FGG are generated in each of four successive memory cycle subintervals. It must be remembered that these memory cycle subintervals are successive insofar as processing within the arithmetic unit goes. However, since the arithmetic unit is allocated whatever memory cycle subintervals are not in demand by the peripheral control unit during the execution phase of other peripheral instructions, these "successive" time cycles will not necessarily be successive in terms of absolute time. It is further apparent, with reference to FIGURE 5*a*, that the bus output lines FO1–FO6 carry meaningful information during each of these "successive" operative cycles of the arithmetic unit. Also, status signal FSS is synchronized with control signal FKK so as to return a signal to the central processor indicative of the operative condition of the addressed peripheral control unit during the extraction phase of the processing of a programmed instruction. It is further apparent from FIGURE 5*a* that the output of the unit address flip-flop of the peripheral control unit, actually addressed by signal FDD, will be activated and remain activated until terminated by the reception of the control signal FGG, indicating the termination of the extraction phase. In like manner, receipt of the signal FGG is also effective in setting "status" flip-flop 120 to its busy condition, the latter remaining "set" until the termination of the execution phase of the peripheral data transfer instruction.

Reference is now made to FIGURE 5*b* which concerns the timing chart for the execution phase of the peripheral data transfer instruction. In accordance with the implementation of the system as outlined above, it is possible to transfer a single character of information between memory and the addressed peripheral control unit once every memory cycle; i.e. in the preferred embodiment of the present invention, once every three memory cycle subintervals. It has also been pointed out that not every memory cycle subinterval so allocated will be utilized by the peripheral device receiving or transferring the information. However, for purposes of continuity, the timing diagram of FIGURE 5*b* discloses transfers of information as being effected in successive memory cycle subintervals allocated to read-write channel 2.

As mentioned above, preliminary to the transfer of a character of information, a channel inquiry signal is directed to the peripheral control unit allocated the succeeding memory cycle subinterval. Thus, during memory cycle subinterval 1, a channel inquiry signal is directed to the addressed peripheral control unit on lines FD1–FD3 of FIGURE 3. Accordingly, a response is generated within the response signal storage and decoder member 142 and returned on lines FR1–FR3.

Included in the response repertoire of the preferred embodiment of the subject system are coded representations indicating that no action is desired to be taken during the subsequent operative cycle of that particular read-write channel and that the allocated time should be given to the central processor arithmetic unit for the processing of a character of a program instruction or other arithmetic operation. Alternatively, the response signals may indicate a frame-output or frame-input demand, which initiates the reading or writing, to the peripheral control unit or the central processor memory respectively, of a new frame of data, with or without the incrementing or decrementing of the main memory address register 34. The response signal may also be in the form of a row demand which resets the starting location register of the associated read-write channel in control memory 32 to the representation stored in the associated present location register thereof to thereby initiate the scanning of a new area of memory. A row demand may also effect the resetting of the present location register to the representation stored in the starting location counter so as to initiate a rescanning of that area of memory.

The response signal may also appear as an end-of-order response signal which indicates to the associated peripheral control unit that the processing of the instruction, and the data transfer itself, have been completed. In the preferred embodiment of the present invention this indication is effected by resetting the "busy" flip-flop 120 of peripheral control unit 110. The end-of-order response signal is also effective in releasing the associated read-write channel by resetting the respective activity indicator located in the peripheral interface 13 of FIGURE 2. Referring briefly to FIGURE 2, it is seen that response decoder 78 generates an output in response to the end-of-order signal, the output signal of decoder 78 in turn arrives at the input of AND gates 72, 74 and 76 in synchronization with a delayed signal from that stage of counter 56 which during the immediately preceding memory cycle subinterval was in its set condition. The output of the conditioned one of AND gates 72, 74 or 76 is thus effective in resetting the associated flip-flops 58, 60 or 62 to thereby indicate the release of that particular read-write channel.

Referring again to FIGURE 5*b*, therein are shown time slots associated with bus output and bus input signals FO1–FO6 and F51–F56 respectively. Although the bus output and bus input time slots are present during each of the memory cycle subintervals, information will be transferred between the peripheral device associated with the addressed peripheral control unit and main memory only during the assigned memory cycle subinterval and then, only if the response signals generated during the preceding subinterval indicate that the peripheral device is ready for the transfer of a character of information. More specifically, during each memory cycle subinterval immediately preceding the subinterval associated with the read-write channel assigned to the processing of the particular peripheral data transfer instruction of this example, that is, read-write channel 2 in the present instance, a channel inquiry signal is directed to the programmed peripheral device through the addressed peripheral control unit, and the response lines are interpreted to ascertain whether or not the succeeding memory cycle subinterval is to be utilized in the processing of a character of information.

If the peripheral data transfer instruction of this example, as currently being processed, is in the nature of a "read" tape instruction, and if the response signals, as interpreted in member 142, indicate that the peripheral device is ready to accept a character of information, signals are generated on the response lines FR1 through FR3, which are returned to the central processor by way of the peripheral interface 13, to initiate the transfer of the character of information located in the storage location of main memory 30 as identified by the digital representation in the present location register for read-write channel 2.

Accordingly, the response signals returning to the central processor with the demands generated in the peripheral devices are synchronized at the peripheral interface 13 with delayed output signals from the counter 56. This combination of signals are in turn transferred to the central processor to identify to the latter the nature of the impending transfer. More specifically, in the case of an input or output frame demand, signals identifying the demand signals as such are transferred to the control memory address register 38 which in turn directs the transfer of the information stored in the read-write present location counter during the subinterval associated with read-write channel 2 and deposits this information in the main memory address register 34. The digital representation transferred to the main memory address register 34 in turn controls the location of main memory 30 from whence, or into which, a character of information is transferred.

Somewhat simultaneous with this information transfer, the contents of the read-write channel 2 present location register are modified. In this respect, the digital representation in the main memory address register 34 is transferred to the auxiliary register 36 wherein its is incremented or decremented in accordance with the nature of the information transfer. In the present instance, the nature of the modification would in part depend on whether the "read" tape instruction was programmed so as to read tape in the forward or reverse direction; and is otherwise dependent upon the nature of the response signals. Thus, in a "read" tape forward instruction, the modification of the read-write channel 2 present location register may amount to the incrementation by unity of the information stored therein. After being incremented or decremented, the digital representation in the auxiliary register 36 is then returned to the read-write present location counter of control memory 32 from whence it originated. It is also possible that the response lines will carry a special demand signal which will effect the transfer of a character of information from main memory as outlined above, however, this transfer will not be accompanied by incrementing or decrementing of the contents of the main memory address register 34 before it is returned to control memory 32.

The response signals may also be in the form of a row demand which resets the read-write channel 2 starting location register to the representations stored in the associated present location register to thereby initiate the scanning of a new area of memory; or alternatively, the row demand may effect a rescanning of the same area of memory by resetting the read-write channel 2 present location register to the representation stored in the read-write channel 2 starting location register. Since this interchange of information has nothing to do with the main memory it is effected by means of an internal transfer within the control memory 32. Thus to initiate the scanning of a new area of memory, the internal transfer is in part effected by transferring the contents of the starting location register into the sense amplifiers associated with control memory 32 after which the information is transferred into the present location register associated with read-write channel 2. If the response signals indicate that no action is to be taken during the subsequent operative cycle of read-write channel 2, the present location register remains unchanged and the allocated time cycle is given to the arithmetic unit for processing of an instruction therein.

If the peripheral data transfer instruction currently being processed is in the nature of a "write" tape instruction, and if the response signals as interpreted in member 142 indicate that the peripheral device is ready to transfer a character of information, response lines FR1 through FR3 carry a signal representation to the central processor indicating the nature of the transfer desired. Accordingly, during the succeeding operative cycle signals are generated on the lines connecting member 142 to gating means 146 to thereby enable the information on the data input lines to be transferred to the location in main memory as specified by the digital representation in the present location register associated with read-write channel 2.

As mentioned above, immediately upon completion of the extraction phase of the PDT instruction of the present example, the arithmetic unit was again made available to process central processor orders or other program instructions. Accordingly, if the response signals returned on lines FR1–FR3 indicate that no action is to be taken during the next operative subinterval allocated to the read-write channel associated with the program instruction of this example, the subinterval will be made available to the arithmetic unit. Alternatively, a frame demand may be generated on response lines FR1–FR3 which requests that the next character of information be permitted to be transferred from the card reader. As indicated, this data transfer will take place during the memory cycle subinterval assigned by the memory cycle distributor to the read-write channel processing the instruction. Accordingly, a character of information will be read off of data input lines F51–F56 and placed in the location of main memory 30 as specified by the information in the read-write present location counter of control memory 32, whereafter the present location counter will be incremented. In this manner, the processing of the card read instruction of this example continues until all the information has been read into the specified locations of main memory.

If instead, the system were in the process of executing a card punch operation, the transfer of information from main memory to the card punch would continue until a particular punctuation bit associated with the data being transferred was detected thereby indicating the completion of the execution phase and of the instruction itself. The detection of the particular punctuation bit signalling the completion of the execution phase of the card punch instruction is effective in generating a control signal FFF which is combined in AND gate 145 with a signal taken from the line connecting the response signal decoder 142 with gating means 147. The output of AND gate 145, as transferred to the associated peripheral device, is effective in generating an end-of-order response signal which resets the read-write channel assignment decoder flip-flops 134, 135 and 136, and also the status indicator flip-flop 120, as depicted in the timing diagram of FIGURE 5*b*. The termination of the card read instruction outlined above, is effected in a similar manner; however, therein the end-of-order response signal is generated by the peripheral device when it has been ascertained that the information transfer is complete.

In the execution of a "print" order on a drum printer, it is necessary to establish recursion cycles during which the various characters constituting a row of print are reviewed. The drum of a conventional printer may include 120 characters of each type positioned across the face of the drum and as many as 56 of these rows of characters positioned about the periphery of the drum. A row of print hammers equal in number to the number of characters in a row of print will be cooperatively positioned with respect to the characters of a row of type. Each of these print hammers will have associated therewith a flip-flop which is set in accordance with the results of a comparison effected between a character of information being transferred out of memory and the particular character presently under review.

Accordingly, a "print" order to be executed on read-write channel 2 is initiated by transferring into both the starting and current location registers for read-write channel 2 a digital representation identifying the location in main memory 30 at which the first character, to be printed, is stored. When ready, the printer initiates a frame demand which causes the character representation stored in the memory location identified by the present location counter of read-write channel 2 to be transferred out of memory and placed on the output lines FO1 through FO6. As the information arrives at the printer it is scanned to see whether the first in the row of characters to be printed compares favorably with the character presently on the information output lines. If the answer is in the affirmative, the flip-flop associated with the print hammer of the first character of the row is set. Somewhat simultaneously with the information transfer, the digital representations presently stored in the main memory address register 34 is transferred to the auxiliary register 36 wherein it is incremented and returned to the read-write channel present location register of the control memory 32 from whence it originated.

As subsequent frame demands are generated within the printer, the successive storage locations of the area of memory corresponding to the line of print being printed, are referenced and the information therein compared with the print character under review. Thus the flip-flops associated with the print hammers in a row of print will be set in accordance with whether the successive comparisons, effected for transfers of information, proved favorable or unfavorable. After completely scanning the area of memory those print positions with their flip-flop in a set position will have their associated printing hammer actuated to thereby effect the printing of the particular character under review.

The succeeding set of response signals will be in the nature of a row demand whereby the area of memory previously scanned will be rescanned to establish which if any of the various print positions in the row of print compare with a second type of character as positioned on the periphery of the drum lying adjacent to the row of characters just previously reviewed. Thus, each review effects the printing of all characters of a particular type occurring in the line of print being printed. As outlined above, the nature of this row demand finds the contents of the starting location counter being transferred temporarily into the sense amplifiers associated with control memory 32, whereafter this digital representation is restored in the present location counter.

The subsequent frame demand will initiate a comparison of the character under review with the information stored in the location of main memory as identified by the digital representation in the present location counter, and the flip-flop associated with the print hammers in the row of characters to be printed will be set accordingly. As each transfer is effected, the digital representation being returned to the starting location register of control memory 32 is incremented so as to identify the succeeding storage location in main memory to be sensed.

The generation of frame and row demands by the printer continues in the above-outlined manner until the entire spectrum of characters, as positioned around the periphery of the print drum, have been reviewed and the printing of an entire line has been effected. If the printing operation is to continue, the succeeding demand signals carried on response lines FR1 through FR6 may be in the form of a row demand which effects the transfer of the contents of the present location register into the starting location register so as to initiate the scanning of a new area of memory, which will be executed in the manner as outlined above.

It is readily apparent from an understanding of the mode of operation of the above-outlined system that, although priority of processing time is allocated to the peripheral devices, the actual use time of the memory cycle subintervals allocated to a particular programmed peripheral device is so small that the execution of central processor orders in the arithmetic unit is in no way impaired. As an example, it can be shown that in the processing of a card punch instruction, the percentage of the unused memory cycle subintervals necessary to effect the transfer of a character of information is on the order of ninety-nine percent (99%). Although the ratio of unused to available memory cycle subintervals will vary in accordance with the nature of the programmed peripheral device, sufficient time will be available to the processing of central processor orders to ensure that the main program is not sidetracked if all the read-write channels are busy.

It should be apparent that additional read-write channels may be provided to realize a more balanced distribution of operating cycles among the various peripheral devices. These additional read-write channels may be operatively independent of the existing read-write channels or they may be utilized as auxiliary read-write channels as disclosed in the above-mentioned copending application of Louis G. Oliari and Robert P. Fischer. Accordingly, a system may be implemented which includes any desired sampling routine and wherein different sampling rates may be allocated to the various peripheral devices on a priority basis thus ensuring optimum operating efficiency at the expense of a minimum amount of hardware and operating time.

While, in accordance with the provisions of the statutes, there has been illustrated and described the best forms of the invention known, it will be apparent to those skilled in the art that changes may be made in the apparatus described without departing from the spirit of the invention as set forth in the appended claims; and that, in some cases, certain features of the invention may be used to advantage without a corresponding use of other features. Having now described the invention, what is claimed as new is:

1. A data processing apparatus adapted to communicate without intermediate storage between a memory unit and a particular one of a plurality of peripheral devices upon detection of demand signals generated therein, said data processing apparatus having a control circuit including at least one pair of registers for storing address information concerning the data storage positions of the memory unit therein affected, said memory further comprising a plurality of addressable storage locations, a first one of said at least one pair of control circuit registers adapted to store the starting address of an area of memory being referenced by said particular one of said plurality of peripheral devices, said area of memory comprising a variable number of sequential storage locations, a second one of said at least one pair of control circuit registers adapted to store a digital representation identifying the address of the next succeeding location of said plurality of sequential storage locations within said memory area to be referenced, means connected to be responsive to demand signals generated by said particular one of said peripheral devices to initiate the transfer of information between said particular peripheral device and said location identified by said digital representation stored in said second register, and means connected to said second register to modify the digital representation stored in said second register so as to identify the location in said memory unit from whence the succeeding transfer is to be initiated.

2. A data processing apparatus capable of effecting a direct transfer of information between a high-speed memory and a plurality of peripheral devices without intermediate storage, said data processing apparatus having a control circuit including at least one pair of registers in respect to each concurrent peripheral operation for storing address locations of the data storage positions of the main memory therein affected comprising a main memory, said main memory further comprising a plurality of addressable storage locations, a first one of said at least one pair of control circuit registers including means to store encoded information identifying the starting address of an area of said main memory to be referenced by a particular one of said plurality of peripheral devices, said area of main memory further comprising a plurality of sequential storage locations, a second one of said at least one pair of control circuit registers including means to store encoded information identifying the address of the next successive location in said area of main memory to be referenced by said particular one of said plurality of peripheral devices, and means connected to be responsive to signals generated within said data processing apparatus to increment the contents of said second control circuit register, said cycle of operation being repeated upon the detection of signals identifying the next one of the main memory locations to be referenced.

3. A data processing apparatus for effecting the transfer of data between at least one peripheral device and a main memory without intermediate storage, said apparatus having a control circuit which comprises at least one pair of registers for storing address locations of the data storage positions of the main memory, said main memory including a plurality of addressable storage locations, a plurality of peripheral devices, coupling means enabling particular ones of said peripheral devices to be connected to communicate with a particular area of main memory, said last-named means including means associated with a particular one of said peripheral devices to generate demand signals, a first one of said pair of control circuit registers including means to store the address of the first of a plurality of sequentially oriented storage locations in an area of main memory, said second one of said pair of control circuit registers including means to store the address of the next successive location in said area of the main memory to be referenced by said particular one of said plurality of peripheral devices, and means connected to be responsive to said periodic demand signals generated by said particular peripheral device whereby in response to the demand signal of a particular type a rescanning operation may be effected wherein the contents of one of said pair of control circuit registers is transferred to another one of said pair of control circuit registers.

4. A data processing apparatus including means for effecting the transfer of data between at least one peripheral device and a main memory without intermediate storage, said apparatus having a control circuit which comprises at least one pair of registers for storing address locations of the data storage positions of said main memory, said main memory including a plurality of addressable storage locations, a plurality of peripheral devices, coupling means enabling one of said peripheral devices to be connected to communicate with an area of main memory, means associated with said peripheral devices to generate demand signals indicating a desire to effect said communication, a first one of said at least one pair of control circuit registers including means to store the address of the first of a plurality of sequentially oriented storage locations within said main memory, a second one of said at least one pair of control circuit registers including means to store the address of the next successive location in said area of main memory to be referenced by said particular one of said plurality of peripheral devices, and means connected to be responsive to periodic demand signals generated by said coupled one of said plurality of peripheral devices whereby in response to a demand signal of a particular type a rescanning operation may be effected wherein the contents of said first one of said pair of control circuit registers is transferred to said second one of said pair of control circuit registers.

5. A data processing apparatus capable of communicating directly between a main memory and any one of a plurality of peripheral devices wherein the transfer of information is effected on a character-by-character basis with successive characters of information being transferred on demands generated within a particular one of said peripheral devices, comprising a traffic control portion, said traffic control portion further comprising a pair of registers, one of said registers including means for storing the address of a location in said main memory which defines the starting location of an area of memory being referenced, an area of memory being further defined as consisting of a variable number of sequentially oriented storage locations, the other one of said registers including means for storing a digital representation indicating the address of the location in main memory presently being referenced, means connected to be actuated in response to demand signals generated within said particular peripheral device and connected to modify the representation within said other one of said registers so as to indicate the location in main memory at which the succeeding character transfer is to occur, and means connected to be actuated in response to a particular demand representation as generated by said particular peripheral device to effect the transfer of the representations stored in said one register into said other register so as to thereby initiate the referencing of a new area of memory.

6. A data processing apparatus including means for effecting the direct transfer of information between the central processor and any one of a plurality of peripheral devices in response to signals representing demands generated therein, comprising a main memory, a control portion, said main memory further comprising a plurality of addressable storage locations any number of sequentially oriented storage locations of which may be considered as defining an area of memory, said control portion further comprising at least two registers, means connecting the first of said registers to said main memory, said first register storing signals representative of the address of the first location of an area of memory to be referenced, means connecting the second of said registers to said main memory, said second register initially storing signal representative of the address of said first location of said area of memory to be referenced, means connected to be responsive to signals representing demands generated by a particular one of said plurality of peripheral devices to initiate the transfer of a unit of information between said particular peripheral device and the location of main memory identified by the contents of said second register and for simultaneously modifying the signal representation within said second register whereby the transfer of information will continue until said area of memory has been completely referenced.

7. The combination in accordance with claim 6 including means connected to be responsive to a particular condition within said particular peripheral device to initiate the transfer of the signal representation stored in said second register into said first register to thereby reference a new area of memory.

8. The combination in accordance with claim 6 which includes means connected to be responsive to a particular condition within said particular peripheral device to effect the transfer of the signal representation stored in said first register into said second register to thereby initiate a rescanning of said area of memory.

9. A data processing apparatus comprising means for communicating between a memory unit and any one of a plurality of peripheral devices in response to signals representative of demands generated therein, said memory unit further comprising a plurality of addressable storage locations, a control portion including means for defining an area of memory to be referenced, said area of memory further defined as comprising a plurality of sequential storage locations, said control portion further comprising at least two registers, said first and said second registers both connected to said memory unit to be referenced for initially storing signal representations identifying the address of a starting location of an area of main memory, first means connected to be responsive to demand representing signals generated within said peripheral device to transfer a character of information between said memory unit and said peripheral device beginning at the location in the memory unit as specified by the contents of said second register, second means connected to be actuated in response to said demand representing signals to increment the contents of said second register, said first and said second means continuing to respond to said demand signals to thereby effect the transfer of information a character at a time until said area of memory has been completely referenced.

10. A data processing apparatus comprising a main memory including a plurality of storage locations, a traffic control portion capable of effecting the transfer of information between any area of said main memory and any one of a plurality of peripheral devices, an area of memory being further defined as comprising a variable length portion of said main memory, said traffic control portion being further comprised of at least a first and a second register in respect to each concurrent information transfer operation, said first register connected to said main memory for storing a signal representation identifying the address of the first location of an area of memory to be referenced, said second register connected to said main memory for initially storing a signal representation identifying the address of said first location of said area of memory, means connected to be responsive to particular signals generated within said particular one of said peripheral devices to effect the transfer of successive units of information between said main memory and said particular peripheral device and for modifying the contents of said second register as each transfer is effected.

11. A data processing apparatus capable of effecting the transfer of information between a central processor and a plurality of peripheral devices, comprising a main memory including a plurality of storage locations, a traffic control portion capable of effecting the transfer of information character by character between a particular area of said main memory and a particular one of said peripheral devices, an area of memory being further defined as comprising a variable number of storage locations of said main memory, said traffic control portion being further comprised of at least a first and a second register, said first register connected to said main memory for storing signal representing the address of the first of a plurality of sequentially oriented storage location in said main memory, said second register connected to said main memory for storing signal representing the address of a particular one of said plurality of sequential storage location within said main memory, means connected to be responsive to signals generated within said particular one of said peripheral devices to effect the transfer of successive units of information between said main memory and said particular peripheral device and for modifying the contents of said second register as each character of information is transferred, and means connected to become operative upon completing the referencing of the particular area of memory to transfer the contents of either said first or said second register into the other said register to thereby initiate a new scanning sequence.

12. A data processing apparatus capable of effecting the transfer of information to a plurality of associated peripheral devices over a common distribution circuit on a time-sharing basis comprising a memory portion, an arithmetic unit operatively connected to said memory portion, a traffic control portion connected to both said memory portion and said arithmetic portion, said traffic control portion being further connected to a plurality of peripheral control units over said common distribution circuit, each of said plurality of peripheral control units having associated therewith at least one of said plurality of peripheral devices, said traffic control circuit further comprising a memory cycle distributor including means to differentiate each operative cycle thereof into a plurality of time intervals, a first register operatively connected to said memory portion for storing a digital representation identifying the starting address of an area of memory to be referenced, said area of memory comprising a variable number of sequential storage locations within said memory portion, a second register connected to said memory portion for storing a digital representation identifying the address of any one of said plurality of sequential storage locations within said memory area, means connected to be responsive to signals generated by said particular peripheral device to initiate the transfer of said information stored in the location identified by the signal representation stored in said second register during a particular one of said plurality of time intervals, and means connected to said second register to modify the digital representations stored in said second register so as to identify the location in main memory from whence the succeeding transfer is to be initiated.

13. A data processing apparatus capable of collectively transferring information a character at a time during successive operating intervals between a memory unit and a plurality of peripheral devices over a common distribution circuit and for simultaneously processing instructions of an operating routine on a time-sharing basis, said apparatus comprising a memory portion for storing said information and the instructions of said operating routine, an arithmetic unit, means operatively connecting said arithmetic unit to said memory portion, a traffic control portion connected to both said memory portion and said arithmetic unit, said traffic control portion being further connected to a plurality of peripheral control units over said common distribution circuit, each of said plurality of peripheral control units having associated therewith at least one of said plurality of peripheral devices, said traffic control circuit comprising a sequencing circuit having an operative cycle consisting of a plurality of time intervals, means adapted to be energized while said sequencing circuit is operative in one of said time intervals to activate a particular one of said plurality of peripheral control units, means responsive to said activation signal to further activate said at least one of said peripheral devices associated with said particular one of said peripheral control units and to reserve thereto a particular one of said time intervals during subsequent sequencing cycles, said traffic control portion being further comprised of a plurality of pairs of registers, each of said pairs of registers being further associated with a particular one of said plurality of time intervals, the first one of a pair of said registers connected to said memory unit for storing a signal representation identifying the starting address of an area of memory to be referenced, said area of memory comprising a variable number of sequential storage locations within said memory unit, the second one of said pair of registers connected to said memory unit for storing a digital representation identifying the address of a particular one of said plurality of sequential storage locations within said area of memory to be referenced, and means connected to be responsive to certain conditions within said particular one of said plurality of peripheral devices to initiate the transfer of a unit of information between said peripheral device and the location in main memory as identified by the content of said second register during said particular one of said time intervals and to modify the digital representation stored in said second register so as to identify the location in main memory from whence the succeeding transfer is to be initiated.

14. A data processing apparatus capable of effecting the transfer of information between a memory unit and any one of a plurality of peripheral devices in response to demands generated therein without first necessitating an immediate transfer to a fixed image area of said main memory or to a buffered input of the peripheral device, said memory unit comprising a plurality of addressable storage locations, a control portion capable of effecting the transfer of information character by character between a particular area of said memory unit and a particular one of said peripheral devices, an area of memory being further defined as comprising a variable number of said addressable storage locations within said memory unit, a starting location register connected to said memory unit for storing a digital representation identifying the first of a plurality of sequentially oriented storage locations in said memory unit, a present location counter operatively connected to said memory unit for initially storing the digital representation in said starting location register, means connected to be responsive to demand signals generated within said particular one of said peripheral devices to initiate the transfer of a character of information between said memory unit and said peripheral device beginning at the location in the memory unit as specified by the contents of said starting and present location registers and for modifying the digital representation in said present location register so as to identify the location in said memory unit from whence the succeeding transfer is to be initiated, and means connected to become operative upon completing the reference of a particular area of memory to transfer the contents of either said starting location register or said present location register into the other one of said last named registers to thereby initiate a new scanning sequence.

References Cited

UNITED STATES PATENTS

| | | | |
|---|---|---|---|
| 3,140,043 | 7/1964 | Schrimpf | 340—172.5 |
| 3,222,647 | 12/1965 | Strachey | 340—172.5 |
| 3,242,467 | 3/1966 | Lamy | 340—172.5 |
| 3,263,219 | 7/1966 | Brun | 340—172.5 |

ROBERT C. BAILEY, *Primary Examiner.*

I. S. KAVRUKOV, *Assistant Examiner.*

UNITED STATES PATENT OFFICE

CERTIFICATE OF CORRECTION

Patent No. 3,369,221 February 13, 1968

Walter R. Lethin et al.

It is certified that error appears in the above identified patent and that said Letters Patent are hereby corrected as shown below:

Column 18, lines 47 and 52, "adapted", each occurrence, should read -- including means --; same line 47, after "to store" insert -- a digital representation identifying --. Column 19, line 32, after "memory" insert -- to be referenced by a particular one of said plurality of peripheral devices --; line 39, "the" should read -- a --. Column 20, line 72, cancel "to be referenced" and insert -- and including means --.

Signed and sealed this 23rd day of September 1969.

(SEAL)
Attest:

Edward M. Fletcher, Jr.
Attesting Officer

WILLIAM E. SCHUYLER, JR.
Commissioner of Patents